(12) United States Patent
Fortuna et al.

(10) Patent No.: US 12,069,096 B2
(45) Date of Patent: Aug. 20, 2024

(54) ENDPOINT AGENT MANAGEMENT SYSTEMS AND METHODS FOR REMOTE ENDPOINT SECURITY

(71) Applicant: OPEN TEXT HOLDINGS, INC., San Mateo, CA (US)

(72) Inventors: Ilian Waclaw Fortuna, Pasadena, CA (US); Matthew S. Garrett, Pasadena, CA (US); Michael James Bailey, Pasadena, CA (US); Saikumar Ramaswami, San Gabriel, CA (US)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 168 days.

(21) Appl. No.: 17/389,695

(22) Filed: Jul. 30, 2021

(65) Prior Publication Data
US 2022/0038503 A1 Feb. 3, 2022

Related U.S. Application Data

(60) Provisional application No. 63/059,111, filed on Jul. 30, 2020.

(51) Int. Cl.
*H04L 9/40* (2022.01)
*H04L 67/01* (2022.01)
*H04L 67/147* (2022.01)

(52) U.S. Cl.
CPC ............ *H04L 63/20* (2013.01); *H04L 63/102* (2013.01); *H04L 67/01* (2022.05); *H04L 67/147* (2013.01)

(58) Field of Classification Search
CPC ....... H04L 63/20; H04L 67/01; H04L 63/102; H04L 67/147
See application file for complete search history.

(56) References Cited

U.S. PATENT DOCUMENTS

2014/0040136 A1* 2/2014 Gatlin ................ G06Q 30/0637
705/44
2016/0088022 A1* 3/2016 Handa .................... G06F 16/957
726/1

(Continued)

FOREIGN PATENT DOCUMENTS

JP 2007312128 11/2007
WO WO-2010136003 A1 * 12/2010 ......... H04L 63/0209

OTHER PUBLICATIONS

International Search Report and Written Opinion issued for PCT Application No. PCT/US21/43848, mailed Nov. 21, 2021, 7 pages.
(Continued)

*Primary Examiner* — Matthew Smithers
*Assistant Examiner* — Shu Chun Gao
(74) *Attorney, Agent, or Firm* — SPRINKLE IP LAW GROUP

(57) ABSTRACT

An endpoint security system having a Secured Authentication For Enterprise (SAFE) server is enhanced with an auxiliary service. The auxiliary service receives a request to run a job on an endpoint of an enterprise computer network, queues up the job in a central job store, and monitors whether an agent on the endpoint has checked in with the SAFE server. Responsive to the agent on the endpoint checking in with the SAFE server, the auxiliary service establishes, through a secure connection with the SAFE server, a connection with the agent on the endpoint and determines whether the agent has any jobs queued up in the central job store. If so, the auxiliary service dispatches the job from the central job store to the agent on the endpoint through the secure connection with the SAFE server and starts the job by the agent on the endpoint.

20 Claims, 5 Drawing Sheets

(56) References Cited

U.S. PATENT DOCUMENTS

| | | | |
|---|---|---|---|
| 2017/0142129 A1* | 5/2017 | Peng | H04L 63/061 |
| 2018/0324205 A1 | 11/2018 | Ali-Ahmad et al. | |
| 2018/0329733 A1 | 11/2018 | Aronov et al. | |
| 2019/0081982 A1* | 3/2019 | Breton | G06F 21/50 |
| 2019/0261203 A1* | 8/2019 | Raleigh | H04W 24/08 |
| 2022/0272041 A1 | 8/2022 | Blakey et al. | |
| 2023/0032104 A1 | 2/2023 | Fortuna et al. | |

OTHER PUBLICATIONS

"CrowdStrike: We Stop Breaches," [Retrieved from <<https://www.crowdstrike.com>>], 2021, 12 pages.

"FAQ: What is CrowdStrike?" [Retrieved from <<https://www.crowdstrike.com>>], 2021, 14 pages.

"The End of Malware," SentinelOne [Retrieved from <<https://www.sentinelone.com/>>], 2021, 11 pages.

"Microsoft Defender for Endpoint," Microsoft Docs, [Retrieved from <<https://docs.microsoft.com>>], 2021, 5 pages.

"VMware Carbon Black Cloud™ Endpoint," [Retrieved from <<https://www.carbonblack.com/>>], 2020, 6 pages.

"Anti-Malware and Antiransomware, Built for Elastic Security," Enpoint Security, [Retrieved from <<https://www.elastic.co/endpoint-security/>>], 2021, 6 pages.

International Preliminary Report on Patentability (IPRP) issued by the International Bureau for International PCT Application No. PCT/US21/43848, mailed Feb. 9, 2023, 6 pages.

Office Action issued by the United States Patent and Trademark Office (USPTO) for U.S. Appl. No. 17/711,431, mailed Oct. 5, 2023, 19 pages.

Office Action issued by the United States Patent and Trademark Office (USPTO) for U.S. Appl. No. 17/711,431, mailed May 9, 2024, 24 pages.

\* cited by examiner

Endpoint Agent Management Dashboard

Hello, user ▼

Endpoints

Find by FQDN: [ *i ] [Search] Back to Full List

Refresh

| FQDN | Machine | IP First | IP Last | OS | Mac | Agent Version | First CheckedIn | Last CheckedIn | |
|---|---|---|---|---|---|---|---|---|---|
| cbu-fb57yv1.rd.gsi | CBU-FB57YV1 | xx.x.xxx.xxx | xx.x.xxx.xxx | WINDOWS 7 | 90-B1-1C-6A-83-DD | 21.3.0.86 | 1/31/2020 11:07:56 AM | 6/23/2021 3:31:22 PM | Jobs |
| dev-vm-sai.rd.gsi | DEV-VM-SAI | xx.x.xxx.xxx | xx.x.xxx.xxx | WINDOWS 10 | 00-50-56-0A-4C-71 | 21.2.0.91 | 6/7/2021 4:01:07 PM | 6/23/2021 3:30:58 PM | Jobs |

[Previous] [Next]

Endpoint Agent Management Dashboard

Jobs

Hello, user ▼

Refresh

| Queue ID | Job ID | Job Status | Agent Status | FQDN | Error | |
|---|---|---|---|---|---|---|
| 1 | 1 | Downloaded | RJE_COMPLETE | cbu-fb57yv1.rd.gsi | | Details |
| 10 | 10 | Downloaded | RJE_COMPLETE | cbu-fb57yv1.rd.gsi | | Details |
| 11 | 11 | Downloaded | RJE_COMPLETE | cbu-fb57yv1.rd.gsi | | Details |
| 12 | 12 | Downloaded | RJE_COMPLETE | cbu-fb57yv1.rd.gsi | | Details |
| 13 | 13 | Downloaded | RJE_COMPLETE | cbu-fb57yv1.rd.gsi | | Details |
| 14 | 14 | Downloaded | RJE_COMPLETE | cbu-fb57yv1.rd.gsi | | Details |
| 15 | 15 | Downloaded | RJE_COMPLETE | cbu-fb57yv1.rd.gsi | | Details |
| 16 | 16 | Downloaded | RJE_COMPLETE | cbu-fb57yv1.rd.gsi | | Details |
| 17 | 17 | Downloaded | RJE_COMPLETE | cbu-fb57yv1.rd.gsi | | Details |
| 18 | 18 | Downloaded | RJE_COMPLETE | cbu-fb57yv1.rd.gsi | | Details |
| 19 | 19 | Downloaded | RJE_COMPLETE | cbu-fb57yv1.rd.gsi | | Details |
| 2 | 2 | Downloaded | RJE_COMPLETE | cbu-fb57yv1.rd.gsi | | Details |
| 20 | 20 | Downloaded | RJE_COMPLETE | cbu-fb57yv1.rd.gsi | | Details |
| 21 | 21 | Downloaded | RJE_COMPLETE | cbu-fb57yv1.rd.gsi | | Details |

ENDPOINT AGENT MANAGEMENT SYSTEMS AND METHODS FOR REMOTE ENDPOINT SECURITY

CROSS-REFERENCE TO RELATED APPLICATION(S)

This application claims a benefit of priority under 35 U.S.C. § 119(e) from U.S. Provisional Application No. 63/059,111, filed Jul. 30, 2020, entitled "SYSTEMS AND METHODS FOR REMOTE ENDPOINT SECURITY," which is hereby fully incorporated by reference herein.

TECHNICAL FIELD

This disclosure relates generally to the field of computer network security. More particularly, this disclosure relates to endpoint agent management systems, methods, and computer program products for remote endpoint security in a distributed network computing environment.

BACKGROUND OF THE RELATED ART

Endpoint security generally refers to securing endpoints (entry points) of end-user devices, for instance, desktop computers, laptop computers, mobile devices, wireless device, etc. that are used by users (e.g., employees of an enterprise) of a secure computer network (e.g., an enterprise computer network, as opposed to a public network such as the Internet). The connections of these endpoints to the secure computer networks create possible attack paths that could be exploited by malicious actors and campaigns. To address ever evolving security threats to a secure computer network, an endpoint security system can be installed on a computer network to provide comprehensive defense mechanisms, including antivirus scanning, threat detection, investigation and response, device management, data leak protection, and so on.

Such an endpoint security system can usually be a pull-based system, which means that clients of the endpoint security system would call out and communicate with target nodes (endpoints). Today, however, more and more users work remotely outside of their respective secure computer networks, with the endpoints that they use for work being outside of, and remote from, the secure computer networks (e.g., while traveling and logged in to a hotel's wireless network and then logged in to an enterprise computer network over the Internet). That is, from the perspective of network security, the endpoints are no longer confined to a small area or a local network. This means that the agents that work on the endpoints can virtually be anywhere. This kind of agent mobility, and potential dysconnectivity, can make it difficult for a pull-based endpoint security system to manage agents effectively and efficiently. In view of the difficulty in managing enterprise endpoint security infrastructure, particularly with regards to the distributed remote agents, there is room for technical innovations and improvements.

SUMMARY OF THE DISCLOSURE

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

The invention disclosed herein provides a robust solution to managing enterprise endpoint security infrastructure, particularly with regards to remote endpoints and agents running on such remote endpoints. The robust remote endpoint security solution disclosed herein can enhance an endpoint security infrastructure in which an agent running on an endpoint calls in to an endpoint security system, as opposed to a client calling out to an endpoint in a pull-based endpoint security system.

In some embodiments, the enterprise endpoint security infrastructure is enhanced with an auxiliary service securely connected to a Secured Authentication For Enterprise (SAFE) server. The auxiliary service may receive a request to run a job on an endpoint of an enterprise computer network. The request may be received from the SAFE server or a client thereof. The auxiliary service may queue up the job in a central job store and monitors whether an agent on the endpoint has checked in with the SAFE server. In some embodiments, the auxiliary service may monitor a network address on the SAFE server assigned for the agent to check in with the SAFE server. In some embodiments, the agent on the endpoint checks in with the SAFE server with an application programming call containing information that identifies the agent and that inquires whether any job is ready for the agent.

In some embodiments, responsive to the agent on the endpoint checking in with the SAFE server, the auxiliary service may establish, through the secure connection with the SAFE server, a connection with the agent on the endpoint and determine whether the agent has any job(s) queued up in the central job store. If so, the auxiliary service dispatches the job from the central job store to the agent on the endpoint through the secure connection with the SAFE server and starts the job by the agent on the endpoint.

In some embodiments, the auxiliary service may query, through the secure connection with the SAFE server, the agent on the endpoint about a prior job previously sent to the agent to run on the endpoint. In some embodiments, the auxiliary service may receive, from the SAFE server, an update about a prior job previously sent to the agent to run on the endpoint. In some embodiments, the auxiliary service may, through the secure connection with the SAFE server, pull data from a completed job ran by the agent on the endpoint.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. The features illustrated in the drawings are not necessarily drawn to scale.

FIGS. 3A-3B depict example pages of a user interface of an endpoint security system according to some embodiments disclosed herein.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
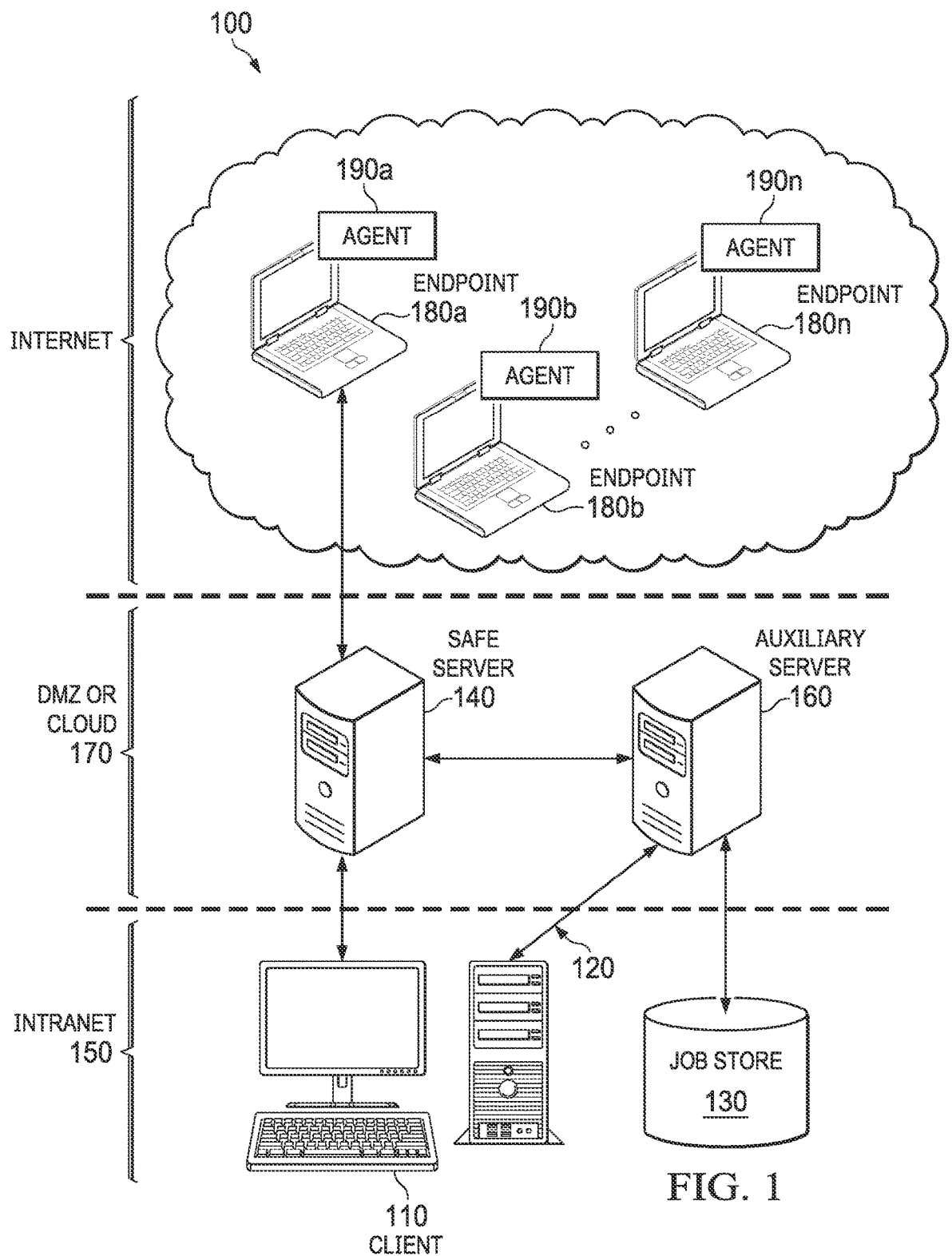
FIG. 1 depicts a diagrammatic representation of a distributed endpoint security system with distributed endpoints and an auxiliary service according to some embodiments disclosed herein.

As a non-limiting example, FIG. 1 shows a distributed endpoint security system 100 having a Secured Authentication For Enterprise (SAFE) server 140 which functions as a gateway that operates in a demilitarized zone (DMZ) for endpoints (e.g., endpoints 180a, 180b, . . . , 180n) on the Internet to connect to a secure computer network (e.g., an enterprise computer network such as intranet 150). In this disclosure, an endpoint security system can reside in a DMZ (e.g., DMZ170), in a cloud (not shown), or in an enterprise computer network.

In computing, a DMZ refers to a perimeter network that protects an organization's local area network (LAN) from untrusted sources. In this case, the DMZ functions as a subnetwork containing the enterprise's exposed, outward-facing services. Generally, a DMZ acts as an exposed point to an untrusted network, usually the Internet.

Alternatively, in some embodiments, the SAFE server can be hosted in a cloud computing environment (e.g., cloud 170) and provide SAFE functions as services to its clients.

The term "cloud" generally refers to servers that are accessed over the Internet, including software and databases that run on those servers. By using cloud computing, users and enterprises do not have to manage physical servers themselves or run software applications on their own machines. The architecture shown in the example of FIG. 1 allows both the SAFE server and an auxiliary server (which provides auxiliary service 160, discussed below) to operate in a DMZ (which is on the premises of an enterprise) or in the cloud.

In this disclosure, a client (e.g., client 110) of the SAFE server is a network computing device that runs one or more applications configured for instructing an endpoint security agent (e.g., agent 190a, 190b, . . . , or 190n) running on an endpoint (e.g., endpoint 180a) on what job to do and how to do it. The client can run a type of endpoint security application or any type of applications that need to perform some data processing operations on the endpoint for a variety of reasons (e.g., compliance regulations, data privacy laws, enterprise policies, etc.). The SAFE server is configured for performing the authentication of who can do what job and where.

The agent is a low level program that runs on the endpoint and that actually performs the job on the endpoint, as requested by an application. The agent has full access to essentially everything on the hard drive of the endpoint. A job, therefore, can refer to an operation that the agent runs on the hard drive of the endpoint (e.g., scanning the hard drive of the endpoint for malware or a particular type of files, etc.). This is further discussed below. Various types of endpoint security jobs that could be performed by an agent are known to those skilled in the art and thus are not further described herein. Although various types of endpoint security jobs are known to those skilled in the art, how an agent disclosed herein receives and reports a job is new and leverages the unique SAFE client-server architecture exemplified in FIG. 1.

In embodiments disclosed herein, each agent is configured with a built-in security and, therefore, is not accessible by other applications running on the endpoint. The agent is provisioned in the SAFE server before it is deployed to the endpoint. The SAFE server is also capable of updating the agent once it is deployed to the endpoint.

The endpoint security system disclosed herein is adapted for continuously monitoring threats and providing visualizations for managing agents (also referred to herein as enterprise agents, as they are proprietary software that runs on all endpoints that belong to the enterprise) operating on endpoints of the enterprise computer network. A goal of the invention is that the robust remote endpoint security solution disclosed herein can, for instance, queue up asynchronous endpoint security job orders and receive updates during check-ins while the endpoint that the user uses operates remotely from the enterprise computer network. De-coupling job orders from agent operations allows an authorized user of an enterprise (e.g., an information security manager of the enterprise) to monitor and manage the agents even if the endpoints, on which the agents operate, are not always connected to the enterprise computer network.

In embodiments disclosed herein, this goal can be realized by enhancing the endpoint security infrastructure shown in FIG. 1 with an auxiliary server (e.g., auxiliary server 160) which functions as an auxiliary to the SAFE server. The auxiliary server is adapted for providing a new service, referred to herein as the auxiliary service, that can queue up job requests from the clients of the SAFE server and dispatch jobs to agents running on endpoints (target nodes).

With the addition of the auxiliary service, the invention disclosed herein provides a much stronger way to distribute processes out to the target nodes.

Although a single machine is shown in FIG. 1, there can be multiple SAFE servers and/or multiple auxiliary servers. In some embodiments, there can be a one-to-one relationship between a SAFE server and an auxiliary server. The jobs, however, are centrally stored in a single job store (e.g., job store 130). Although not shown in FIG. 1, in embodiments where multiple SAFE servers and/or multiple auxiliary servers are involved, a load balancer may be utilized to balance the loads on the servers.

In embodiments disclosed herein, the agents are programmed to run different types of jobs on the endpoints. Examples of jobs can include collecting and preserving potentially relevant data for various reasons, for instance, for investigative purposes, forensic purposes, discovery purposes, regulatory compliance purposes, and so on.

In some embodiments, the agents can be distributed and run on anywhere. A client may request access to one or more agents through a SAFE server. The SAFE server authenticates the client and returns a token to the client. Once logged into the SAFE server, the client can use the token to communicate with the auxiliary service (e.g., via an application programming interface (API) call 120). For example, as illustrated in FIG. 1, when a job request is received via an application running on the client, the client may call the auxiliary service with a job submission for an agent on a particular endpoint (or agents on certain endpoints). The auxiliary service queues up the job in the job store and creates an entry in a database for tracking purposes. While the call from the client may contain job information, the auxiliary service does not process, parse, or analyze the payload of the call.

On the side of the endpoints, the agents are programmed to call the SAFE server periodically (e.g., at a configured time interval) and provide updates on jobs that they operate on the respective endpoints. This eliminates the need for the SAFE server to poll the endpoints (or, more particularly, the agents on the endpoints) and allows the SAFE server to continue to provide updates about the jobs to the auxiliary service (which is an application that runs on the auxiliary server and that is provided to the clients of the SAFE server). Based on the updates from the SAFE server, the auxiliary service, in turn, updates the statuses of the jobs in the job store.

Whenever an agent comes online and communicates with the SAFE server, the agent informs the SAFE server on what job(s) it has completed. The SAFE server, in turn, collects, encrypts, and stores the files from the job(s) and communicates the status of the job to the auxiliary service. In this way, the client that submitted the job will only need to communicate with the auxiliary service and will get the feedback about the agent, e.g., whether it is online, whether the job is ready to be downloaded, etc. That is, instead of hitting the SAFE server about the job, the client checks with the auxiliary service and, once the job is completed as indicated by the auxiliary service, initiate a download of the completed job from the job store via a REST API.

The auxiliary service is adapted for continuously logging the status and movements of an agent (e.g., from one Internet Protocol (IP) address to another). The auxiliary service can service a cluster of applications (that run on one or more client devices) and queue up jobs from these applications. Any suitable logging techniques can be used, for instance, a log used by the SAFE server internally, a log used for logging system-generated events, etc.

In some embodiments, the auxiliary service keeps track of each agent, which can be represented by a host name, IP addresses, etc., using a data structure (e.g., a table, a database, a plain old Java object, etc.). In this way, the auxiliary service can deploy/dispatch the jobs and provide feedback about the jobs, how the agents are doing (on the agent side), etc., to the client(s) of the endpoint security system (or, more specifically, to the applications that run on the client device(s) and that submitted the jobs to be run by the agents on the endpoints).

All these operations can be performed by the auxiliary service in real time. When an agent goes offline, its status will not be updated. When a trusted (e.g., authenticated) client comes online, the auxiliary service can immediately check the status of a job from that client and get the result ready for the trusted client.

Without the auxiliary service disclosed herein, a dedicated, preconfigured connection is needed for each agent that runs on an endpoint to call into a secure and safe environment provided by the SAFE server. With the auxiliary service disclosed herein, an agent that runs on an endpoint does not need to have a dedicated, preconfigured connection to the SAFE server. Rather, the agent is provided with the knowledge of what service (address) to use when they want to make a request to call and log in to the SAFE server. That is, the agent connects to the SAFE server as before. However, instead of directly connecting to the SAFE server, the agent now uses a web-based service. At the SAFE server, all the calls from the agents are then routed to the auxiliary server that hosts the auxiliary service.

When an agent drops out (e.g., when an endpoint is no longer visible to the endpoint security system), the connection between the agent and the SAFE server is severed. As an agent comes back online, the SAFE server establishes a secure network TCP/IP connection and immediately delegates the call from the agent to the auxiliary service. The SAFE server is operable to inform the auxiliary server that this agent has been connected and the auxiliary service would then locate and dispatch the job specified for the agent.

The addition of the auxiliary service does not change the secure relationship between the agent and the SAFE server in distributed endpoint security system 100. Rather, this secure relationship is extended through the secure connection between the SAFE server and the auxiliary server. With the auxiliary service, which keeps track of where each agent is and what job(s) the agent is working on, the SAFE server can provide feedback about the job(s) from the agent to the requesting client.

Previously, when a client submits a job, if the agent is not online, the SAFE server will immediately reject the job and indicate that the job cannot be performed. With the auxiliary service, if the agent is not online, the SAFE server will not reject the job. Instead, the SAFE server will immediately send the job to the auxiliary service.

The auxiliary service stores the job in the job store and is ready for monitoring when the agent comes back online. As soon as the agent comes back online, the auxiliary service is informed by the SAFE server that the agent has come back online. The auxiliary service then searches the job store for any job queued up for the agent. This gives the flexibility that the agent does not have to be online for an application to submit a job to the agent.

The job store, which could be implemented as a database or any suitable data structure accessible by the auxiliary service, can be remote from the auxiliary server. For instance, in some embodiments, the job store can be centrally hosted in a cloud or operates behind the firewall in a secure enterprise computer network.

As discussed above, the agent can reside virtually anywhere and can go online and offline at any given time, so long as it checks in to the SAFE server periodically and/or as configured. While FIG. 1 shows the SAFE server and the auxiliary server as two components of an endpoint security system, they can reside on the same server machine, according to some embodiments.

Figure 2:
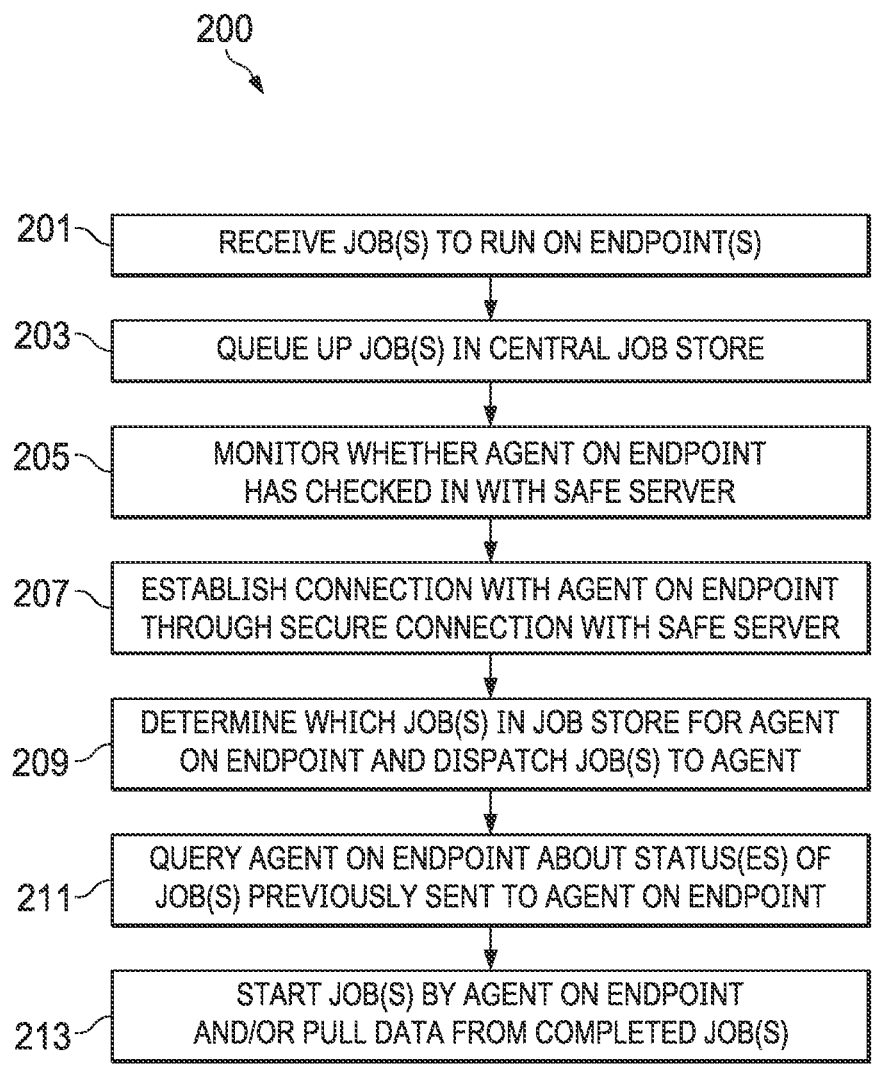
FIG. 2 shows an example of a process performed by an auxiliary service according to some embodiments disclosed herein.

FIG. 2 shows an example of a process 200 performed by an auxiliary service disclosed herein to queue up client-submitted jobs and monitor the statuses of the client-submitted jobs as performed by agents running on endpoints of an enterprise computer network, including remote endpoints that may not always be connected to the enterprise computer network.

In some embodiments, the auxiliary service may receive, through a SAFE service or from a client, a request to run a job or jobs on one or more endpoints (201). In some embodiments, the client may send the request to the SAFE service which is provided by the SAFE server. The SAFE server, in turn, may communicate the request via a secure connection to the auxiliary service, which is provided by the auxiliary server. Alternatively, in some embodiments, the client may authenticate with the SAFE server to obtain a valid token and submit a job request with the valid token to the auxiliary service provided by the auxiliary server. The auxiliary service receives the job, saves (stores) the job in the job store (which can be on-prem or cloud-based), and monitors, through the SAFE server, the agent's online status (203).

The agent on the endpoint checks in with the SAFE server periodically. The agent is not always online. For instance, some agents will come on at 3 AM in the morning. However, the agent can be configured for communicating with the SAFE server periodically via a particular port of the SAFE server. As discussed below, the auxiliary service is configured for monitoring whether any agent has checked in with the SAFE server (205). When an agent checks in with the SAFE server, the auxiliary service learns of the online status of the agent and establishes a connection with the agent on the endpoint, for instance, through a secure connection with the SAFE server (207).

The auxiliary service then determines what job(s) in the job store is/are for the agent on the endpoint and dispatches the job(s) to the endpoint (209). A non-limiting example of a job can be an investigation of documents stored on a hard drive on the endpoint. The investigation may entail looking for certain keywords in the documents stored on the hard drive and returning the results back.

For security reasons, at the time the job was requested by the client, the auxiliary service does not call out to the agent to start the job. Rather, the auxiliary service waits for the agent on the endpoint to come online (i.e., when the agent checks in with the SAFE server) and then establishes a connection with the agent through the SAFE server. Meanwhile, job requests from clients of the SAFE server are queued up by the auxiliary service (e.g., centrally stored in the job store, which can be implemented on any suitable data structure).

Because sometimes an agent is not available to do a job (e.g., when an endpoint which the agent runs is offline or otherwise not available), the auxiliary service is configured for monitoring the statuses of all the agents. As soon as an agent on an endpoint becomes available, the auxiliary service immediately dispatches the job(s) meant for that particular agent to the endpoint. In some embodiments, the auxiliary service also queries the agent or otherwise gets feedback from the agent on the endpoint, through the secure connection with the SAFE server, about existing or prior job(s) previously sent to the agent on the endpoint, for instance, whether a job previously sent to the endpoint has been completed by the agent on the endpoint (211).

In some embodiments, this query action can be optional as the agent on the endpoint can be configured to provide the SAFE server, upon connection with the SAFE server, any updates on job(s) previously sent to the agent to run on the endpoint. In such cases, the auxiliary service can receive or obtain the updates from the SAFE server without having to query the agent on the endpoint.

The auxiliary service then starts the job(s) thus dispatched to the agent on the endpoint and/or pulls the data from the completed job(s) (213). The actions performed by the auxiliary service are discussed below in further details.

As discussed above, the jobs are centrally stored or otherwise queued up by the auxiliary service (e.g., in a data structure implementing the data store). The auxiliary service, however, is not a job scheduler. The agents are not directly connected to the auxiliary service and the agents do not have access to the data structure where the jobs are stored. Rather, each agent is configured for connecting to the SAFE service (e.g., via an application programming interface (API) provided by the SAFE server) and sending its status information to the SAFE service from time to time, which informs the SAFE service whether it is online or offline.

FIGS. 3A-3B depict example pages of a user interface 300 of an endpoint security system disclosed herein (e.g., endpoint security system 100). In some embodiments, user interface 300 may represent an endpoint agent management dashboard through which an authorized user of the endpoint security system can monitor agents running on endpoints and the statuses of the jobs performed by these agents on the endpoints. In the example of user interface 300, each endpoint is identified by a fully qualified domain name (FQDN). As illustrated in FIGS. 3A-3B, the nature and content of each job is not monitored or tracked. Rather, the endpoint security system keeps track of each job status and the time at which each agent initially checked in and last checked in.

In today's enterprise working environment, employees can have corporate computers such as laptop computers, mobile devices, etc. outside of the enterprise computing environment. That is, endpoints of an enterprise computer network may not be or need to be on the premises of the enterprise and may instead be on some private or public network when using programs needed for their work (e.g., mail software, teleconferencing tools, etc.). In embodiments disclosed herein, these endpoints have agents installed on them (e.g., deployed from the SAFE server). When inside the enterprise computer network, the SAFE server can connect to the agents. However, when the endpoints are outside of the enterprise computer network, the SAFE server cannot connect to the agents (because the SAFE server cannot call out to the endpoints not knowing where they are).

With the enhanced endpoint security architecture described above, instead of the SAFE server connecting to the endpoints, the endpoints take the proactive action to connect to the SAFE server and inform the SAFE server as to what they are. In this way, the SAFE server can run on a static server machine with a static IP address and a static name that can be resolved. An endpoint can securely connect to the SAFE server at anytime from anywhere on the Internet. Once connected, the auxiliary service can establish a secure connection with the agent on the endpoint through the active connection between the endpoint and the SAFE server and dispatch job(s) to the agent. Through the connection thus established, the agent can provide its status information and feedback on existing job(s) that the agent executed/is executing on the endpoint.

As discussed above, with the agents periodically checking themselves in with the SAFE server (e.g., at a configurable time interval such as five minutes), the SAFE server can generate a user interface with agent-related information for presentation on a client device (e.g., via user interface 300). This provide visibility to all endpoints of the enterprise computer network, regardless of whether an endpoint operates from inside or outside of the enterprise computer network.

In some embodiments, an agent can check in with the SAFE server by making an API call to a preassigned network address on the SAFE server. This network address, which can include a particular port of the SAFE server, can be assigned at the time that the SAFE server is installed on a server machine. The network address specifies a port of the SAFE server to which the agents can direct API calls and at which the auxiliary service can listen. The agents are provided with this network address so that they can make API calls to the SAFE server.

An API call from an agent contains information that identifies the agent and that inquires whether any job is ready for it. By having this "check in" feature on each agent, the endpoint security system allows each of its clients to essentially have a window in which they can connect to the endpoint and instruct the agent on the endpoint to perform desired operation(s) on the endpoint (e.g., collect documents for a legal hold operation, preview documents for an electronic discovery process, perform an investigation job, etc.) and return the result(s) back to the respective client.

More specifically, the auxiliary service is configured for monitoring the network address on the SAFE server assigned for the agents to check in with the SAFE server. As soon as an agent checks in, the auxiliary service has the agent's information from the SAFE server. The auxiliary service checks the job store using the agent's information and determines whether the agent has any job queued up in the job store. If nothing is queued up for the agent, the agent gets off the connection and calls back again later. If a job from a client is queued up for the agent (e.g., to run an investigation on the endpoint), the job is retrieved from the job store and sent to the agent on the endpoint. At that time, the endpoint can disconnect from the SAFE server or even go offline (i.e., disconnected from any computer network). The agent can perform the job offline while the endpoint is not connected to any server machines in the enterprise computer network or to the endpoint security system. When the job is complete, the next time the agent checks in with the SAFE server, it informs the SAFE server (and hence the auxiliary service for the SAFE server) that it has the result from the job for pick up.

According to some embodiments, jobs received at any given time from the client side can be queued up by the auxiliary service for pickup up by agents from the endpoint side, also at any given time. The same goes for the clients picking up data from the results of those jobs.

Previously, without the auxiliary service, both the client and the endpoint would need to be connected to the SAFE server at the same time for the agent to receive a job from the client and for the client to receive a result of the job from the agent. As the complexity of network connections continues to grow amid various network security measures (e.g., firewalls, network maps, etc.) and diversity in server technologies, it is not always possible or convenient for the client and the endpoint to both connect to the SAFE server at the same time. With the auxiliary service, such contemporaneous connections are no longer necessary. Instead, a client is able to connect to the SAFE server from anywhere at any given time and send the SAFE server a request for an endpoint to perform a job. Likewise, an agent on an endpoint is able to connect to the SAFE server from anywhere at any given time and, directly or through the SAFE server, check in with the auxiliary service and get a job or a batch of jobs, if any.

As alluded to above, both the SAFE service and the auxiliary service can run on the same machine. However, so long as a secure connection can be established between them, the SAFE service and the auxiliary service can run on different machines. The SAFE server and the auxiliary server have different functions. The SAFE server listens (at the designated port) to connections to endpoints. The auxiliary server interacts with the SAFE server to provide the additional queuing functionality.

In some cases, a batch of jobs can be queued up by the auxiliary service and communicated to the agent on the endpoint through the SAFE server. The connection between an endpoint (and hence an agent on the endpoint) and the auxiliary service can be established in different ways. Similar to making an API call to the SAFE server, the endpoint can make an API call to the auxiliary service and communicate directly with the auxiliary service. Alternatively, the auxiliary service and the endpoint can share the secure connection that the endpoint has with the SAFE server. That is, once the SAFE server authorizes the endpoint to use the auxiliary service and connect to the auxiliary server, the auxiliary server hosting the auxiliary service can communicate with the endpoint directly or through the active secure connection between the SAFE server and the endpoint. Either way, the connection is established between the auxiliary server and the endpoint so that the agent on the endpoint can utilize the auxiliary service provided by the auxiliary server.

Once the secure connection between the auxiliary server and the endpoint is established, the auxiliary service can communicate (directly or through the SAFE server) with the agent to submit or push a job or a batch of jobs to the agent. Additionally or alternatively, the agent can query the auxiliary service for any job that it needs to perform on the endpoint. In some embodiments, each job has some unique identifying information of an endpoint such as a FQDN, IP address, etc., so that the auxiliary service and the agent can identify jobs requested by client(s) for a particular endpoint on which the agent operates.

As a non-limiting example, the auxiliary service waits for an endpoint to connect to the designated port of the SAFE server with its FQDN, which provides a domain name plus a host name. Based on this information, the SAFE server knows (e.g., by checking an internal log) that this is something that the auxiliary service is waiting on, so it provides the connection to the auxiliary service and informs the auxiliary service that an endpoint with the particular FQDN has connected. The auxiliary service, in turn, determines what job(s) in the queue (e.g., the job store) is/are for the connected endpoint based on the endpoint's FQDN and utilizes the active connection between the SAFE server and the endpoint to send the job(s) to the endpoint.

While the auxiliary service is the service that sends the job(s) to the endpoint, in some embodiments, the endpoint always calls the SAFE service to establish a connection.

From this perspective, the auxiliary service essentially provides a service for the SAFE service. That is, the auxiliary service queues up a job for an agent to perform on an endpoint (per a job request sent by a client to the SAFE service), waits for the agent of the endpoint to connect to the SAFE server, finds the job from the queue for the agent, and sends the job back the same route (i.e., over the same connection between the endpoint and the SAFE server).

In some embodiments, the term "job" refers to a set of "in" and "out" (i/o) parameters. The "in" parameters in the job request are passed from the client to the SAFE service, to the auxiliary services, to the job store (which can be implemented on any suitable data structure and which functions as a queue), then eventually back to the auxiliary service, and then to the endpoint. The "out" parameters are what the agent on the endpoint sends back to the auxiliary service via the SAFE service and eventually to the client.

The "in" parameters specify a folder with the input data. Likewise, the "out" parameters specify a folder for files collected by the agent on the endpoint.

Depending upon implementation, the data in the "in" folder can contain any information (e.g., JSON files) that the client needs to send to the endpoint so that the job can be performed by the agent on the endpoint. Once the information is sent to the endpoint, the agent on the endpoint performs the action as requested based on the "in" parameters (i.e., whatever information that was given in the "in" folder).

In some embodiments, output from the action is stored in the "out" folder on the endpoint. Once the job is complete, the "out" folder can contain one or more files in it. The file(s) could be in any appropriate format (e.g., text files) as a result of the action performed by the agent. In some cases, the file(s) could be in a proprietary format. Once a job is considered complete, when the endpoint connects to the SAFE server, the agent is operable to copy the data in the "out" folder and send it to the auxiliary service via the active connection it has with the SAFE server, as discussed above.

As a non-limiting example, when initially setting up a job for an endpoint, a client indicates, in a job request, an input folder with multiple files. These files are copied to the auxiliary server which stores them locally on a non-transitory computer-readable medium (e.g., the auxiliary server's hard disk). The information about the input folder (e.g., metadata) is stored in the storage. When the endpoint connects, the files are copied and sent to the endpoint, which also has its local file folder that stores the files while it's operating. When the job is completed, the agent outputs the results to a different folder on the endpoint. When the endpoint is connected with the SAFE server again after the job is completed, the results (e.g., output files) in the output folder are copied back to the auxiliary server and stored there locally until the client that requested the job comes back to pick up the results from the job, at which time the files in the output folder are copied from the local storage of the auxiliary server back to the client.

The client can, through the API, communicate with the auxiliary service and inquire about the status of the job (e.g., how the job is doing on the agent side). The data about the job is stored on the auxiliary server locally temporarily while the job is active and not yet completed. Once the job is executed by the agent on the endpoint and the results of the job are sent back and then to the client, the job is complete and the data about the job is deleted from the auxiliary server's local storage.

The client can be any computing device that runs an endpoint security application. Generally, endpoint security applications utilize services provided by an endpoint security system (which, in some embodiments, can include the secure authentication service provided by the SAFE server and the auxiliary service provided by the auxiliary server) to perform certain operations on the endpoints in a distributed computing environment.

The type of endpoint operations can vary from application to application. For example, an investigative endpoint security application may need to perform (via an agent) a type of internal or regulatory investigation for human resource (HR) issues, compliance reasons, regulatory inquiries, etc. As another example, an electronic discovery application may need to perform (via an agent) a discovery operation on an endpoint to collect certain documents in order to meet a legal hold or some data retention requirements. Other types of applications, such as virus scanning, cybersecurity risk assessment and management, data forensic analysis, etc. are also possible. The auxiliary service is configured for queuing jobs from different types of applications running on a single client machine and/or multiple client machines. The job queuing function of the auxiliary service is agnostic to application types and job types.

Today, endpoints often can operate from virtually anywhere, including those that run on an intranet on the premises of an enterprise and those that run off-the-network outside the premises of the enterprise. Agents are deployed on thousands of machines. For anyone to access the agents, they have to be authenticated and configured in the SAFE server because the agents are run on the very low level and have full access to data stored on the hard drives of the endpoints. The auxiliary service described above enables a client to reach endpoints that are widely distributed across a massive computer network, including those that are remote from the premises of an enterprise and that are often disconnected from the secure network of the enterprise. Those skilled in the art appreciate that the auxiliary service disclosed herein can be applied to multiple products and/or industries and, therefore, is not limited to serving endpoint security applications.

This reach (or connectivity) for disconnected endpoints is made possible, in part, by decoupling the endpoint gateway (i.e., the SAFE server, and hence the auxiliary server) from the premises of the enterprise. The SAFE service and the auxiliary service can run in the DMZ or, as a cloud deployment option, on the Internet (so long as they are securely protected by the underlying infrastructure). They can also be run on an intranet. They can be run on the same server machine or a virtual machine. So long as the endpoints and clients of the endpoint security system can reach the SAFE server, the two services can run from anywhere. The job store can reside behind the firewall and need not be implemented on the same machine with the auxiliary server.

That is, the invention disclosed herein can be implemented in many ways as long as network connectivity exists between a client, the SAFE server, and an endpoint. This network connectivity, however, is solution-oriented. That is, the client and the endpoint belonging to the same endpoint security solution can connect via the SAFE server specifically set up for the dedicated endpoint security solution. Clients of one endpoint security solution cannot communicate with the SAFE server for another endpoint security solution.

The enterprise for which the endpoint security solution is set up can manage (e.g., via an administrator console or user interface such as user interface 300) the connectivity between the clients, the SAFE server, and the endpoints themselves without relying on third-party vendors such as a cloud operator that hosts a cloud computing environment.

In some cases, token-based authentication is not required for an agent on an endpoint to connect to the SAFE server. In some cases, however, token-based authentication can be utilized to guarantee control of access—who has the ability to, e.g., schedule jobs, who has the ability to pick up data from those jobs, etc. Using tokens is a quick way to control what can be done on where.

Token-based authentication provides another level of security feature for the endpoint security system. For example, a client may wish to have the auxiliary server serve web pages related to its jobs in the queue. In such a case, tokens can be generated and used to limit accesses to the web pages related to jobs belonging to the client. That is, to protect information contained in those web pages, a client would have to have a valid token to view the pages. The only way to get the tokens is through some APIs that are built into the SAFE server. Once the client is authenticated to the SAFE server, it can request access to certain URLs hosted by the auxiliary server. In such cases, tokens are used by the client to communicate with the auxiliary server.

There can be different types of tokens, e.g., one for data access and one for job submission. A data access token allows a client to access a page and obtain information about an endpoint. The client can use the access token to ping a web server about an endpoint, a machine that is connected to the auxiliary server, or to ping the SAFE server. A job submission token allows a client to submit a job that can get scheduled and put on the auxiliary server to be executed later on an endpoint. Different types of tokens are used so that the person that can schedule the job need not be the same person that needs to have access to view information about all the endpoints.

This kind of built-in security corresponds to the level of access users of the endpoint security system have to the information about the endpoints and to the level of information about the jobs running on the endpoints. For example, if a user scheduled a job (using an application running on a client) to do an investigation on an endpoint, the user may not want other users to have that information or be able to other ongoing investigation on the endpoint. However, if a user who wants to view information about an endpoint is an administrator or authorized user who already has access to the keys within the enterprise, then that user should, by default, have access to that information.

The auxiliary service described above provides an enhancement to the endpoint security system, which includes the SAFE server. As a non-limiting example, the SAFE server can be configured such that when the SAFE server is installed or updated, a popup window prompts an administrator to instruct whether the auxiliary service should also be installed. If so, the auxiliary service is installed and configured with default information on the paths to "in" folders, configuration to the job store, and so on, so that it is up and running along with the SAFE server. During installation, the administration may be prompted for additional configuration information on the client side. The agents can be provisioned in the SAFE server and deployed to endpoints through appropriate information technology management tools. Other installation/deployment techniques may also be utilized.

Figure 4:
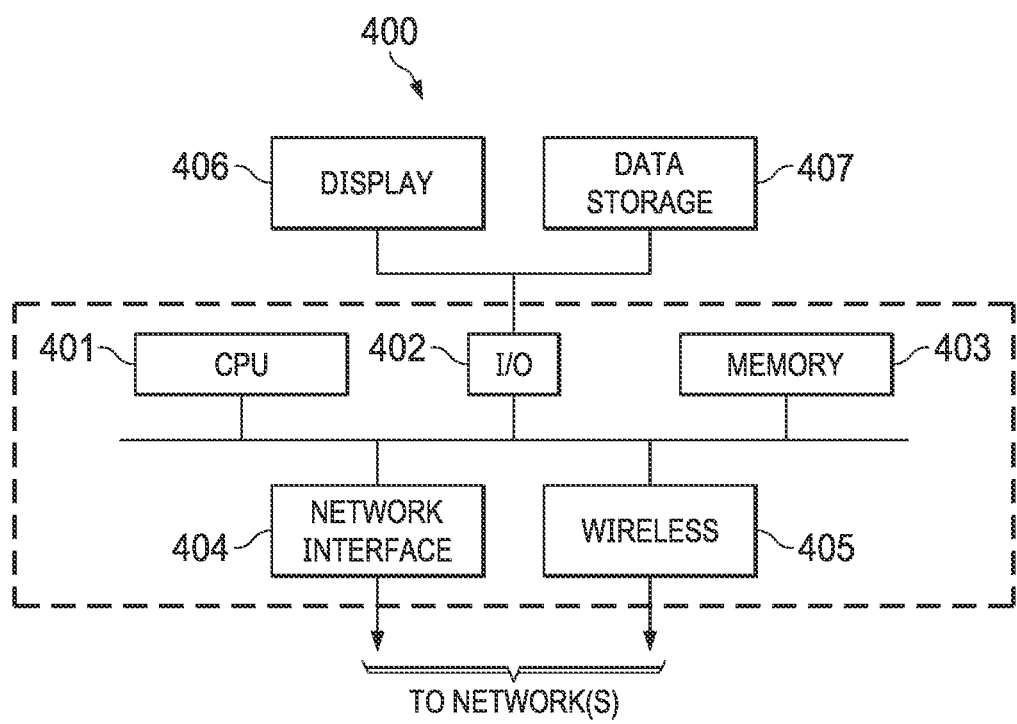
FIG. 4 depicts a diagrammatic representation of a data processing system for implementing an endpoint security system according to some embodiments disclosed herein.

FIG. 4 depicts a diagrammatic representation of a data processing system for implementing an endpoint security system disclosed herein. As shown in FIG. 4, data processing system 400 may include one or more central processing units (CPU) or processors 401 coupled to one or more user input/output (I/O) devices 402 and memory devices 403. Examples of I/O devices 402 may include, but are not limited to, keyboards, displays, monitors, touch screens, printers, electronic pointing devices such as mice, trackballs, styluses, touch pads, or the like. Examples of memory devices 403 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 400 can be coupled to display 406, information device 407 and various peripheral devices (not shown), such as printers, plotters, speakers, etc. through I/O devices 402. Data processing system 400 may also be coupled to external computers or other devices through network interface 404, wireless transceiver 405, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively or additionally, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including C, C++, Java, JavaScript, HyperText Markup Language (HTML), Python, or any other programming or scripting code. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method, comprising:
receiving, by an auxiliary service running on a server machine, a request to run a job on an endpoint of an enterprise computer network, the auxiliary service provided by an auxiliary server which functions as an auxiliary to a Secured Authentication For Enterprise (SAFE) server, wherein the auxiliary server is connected to the SAFE server through a secure connection;
queuing, by the auxiliary service, the job in a central job store wherein the auxiliary service does not call an agent on the endpoint to start the job and waits until the agent on the endpoint has checked in with the SAFE server;
responsive to the agent on the endpoint checking in with the SAFE server, establishing, by the auxiliary service through the secure connection with the SAFE server, a connection with the agent on the endpoint;
determining, by the auxiliary service, that the job queued up in the central job store is for the agent on the endpoint; and
dispatching, by the auxiliary service through the secure connection with the SAFE server, the job from the central job store to the agent on the endpoint;
wherein the auxiliary service does not dispatch the job without the endpoint checking in with the SAFE server;
wherein the SAFE server functions as a gateway that operates in a demilitarized zone (DMZ) for connecting endpoints including the endpoint associated with the job to the enterprise computer network.

2. The method according to claim 1, further comprising:
querying, by the auxiliary service through the secure connection with the SAFE server, the agent on the endpoint about a prior job previously sent to the agent to run on the endpoint.

3. The method according to claim 1, further comprising:
receiving, by the auxiliary service from the SAFE server, an update about a prior job previously sent to the agent to run on the endpoint.

4. The method according to claim 1, further comprising:
pulling, by the auxiliary service through the secure connection with the SAFE server, data from a completed job ran by the agent on the endpoint.

5. The method according to claim 1, further comprising:
monitoring, by the auxiliary service, a network address on the SAFE server assigned for the agent to check in with the SAFE server.

6. The method according to claim 1, wherein the auxiliary service receives the request to run the job on the endpoint from the SAFE server or a client of the SAFE server.

7. The method according to claim 1, wherein the agent on the endpoint checks in with the SAFE server with an application programming call containing information that identifies the agent and that inquires whether any job is ready for the agent.

8. A system, comprising:
a processor;
a non-transitory computer-readable medium; and
stored instructions translatable by the processor for providing an auxiliary service configured for:
receiving a request to run a job on an endpoint of an enterprise computer network, the auxiliary service provided by an auxiliary server which functions as an auxiliary to a Secured Authentication For Enterprise (SAFE) server, wherein the auxiliary server is connected to the SAFE server through a secure connection;
queuing the job in a central job store, wherein the auxiliary service does not call an agent on the endpoint to start the job and waits until the agent on the endpoint has checked in with the SAFE server;
responsive to the agent on the endpoint checking in with the SAFE server, establishing, through the secure connection with the SAFE server, a connection with the agent on the endpoint;
determining that the job queued up in the central job store is for the agent on the endpoint; and
dispatching, through the secure connection with the SAFE server, the job from the central job store to the agent on the endpoint;
wherein the auxiliary service does not dispatch the job without the endpoint checking in with the SAFE server; and
wherein the SAFE server functions as a gateway that operates in a demilitarized zone (DMZ) for connecting endpoints including the endpoint associated with the job to the enterprise computer network.

9. The system of claim 8, wherein the auxiliary service is further configured for:
querying, through the secure connection with the SAFE server, the agent on the endpoint about a prior job previously sent to the agent to run on the endpoint.

10. The system of claim 8, wherein the auxiliary service is further configured for:
receiving, from the SAFE server, an update about a prior job previously sent to the agent to run on the endpoint.

11. The system of claim 8, wherein the auxiliary service is further configured for:
pulling, through the secure connection with the SAFE server, data from a completed job ran by the agent on the endpoint.

12. The system of claim 8, wherein the auxiliary service is further configured for:
monitoring a network address on the SAFE server assigned for the agent to check in with the SAFE server.

13. The system of claim 8, wherein the auxiliary service receives the request to run the job on the endpoint from the SAFE server or a client of the SAFE server.

14. The system of claim 8, wherein the agent on the endpoint checks in with the SAFE server with an application programming call containing information that identifies the agent and that inquires whether any job is ready for the agent.

15. A computer program product comprising a non-transitory computer-readable medium storing instructions translatable by a processor for providing an auxiliary service configured for:
receiving a request to run a job on an endpoint of an enterprise computer network, the auxiliary service provided by an auxiliary server which functions as an auxiliary to a Secured Authentication For Enterprise (SAFE) server, wherein the auxiliary server is connected to the SAFE server through a secure connection;
queuing the job in a central job store, wherein the auxiliary service does not call an agent on the endpoint to start the job and waits until the agent on the endpoint has checked in with the SAFE server;

responsive to the agent on the endpoint checking in with the SAFE server, establishing, through the secure connection with the SAFE server, a connection with the agent on the endpoint;

determining that the job queued up in the central job store is for the agent on the endpoint; and dispatching, through the secure connection with the SAFE server, the job from the central job store to the agent on the endpoint;

wherein the auxiliary service does not dispatch the job without the endpoint checking in with the SAFE server; and wherein the SAFE server functions as a gateway that operates in a demilitarized zone (DMZ) for connecting endpoints including the endpoint associated with the job to the enterprise computer network.

16. The computer program product of claim 15, wherein the auxiliary service is further configured for:

querying, through the secure connection with the SAFE server, the agent on the endpoint about a prior job previously sent to the agent to run on the endpoint.

17. The computer program product of claim 15, wherein the auxiliary service is further configured for:

receiving, from the SAFE server, an update about a prior job previously sent to the agent to run on the endpoint.

18. The computer program product of claim 15, wherein the auxiliary service is further configured for:

pulling, through the secure connection with the SAFE server, data from a completed job ran by the agent on the endpoint.

19. The computer program product of claim 15, wherein the auxiliary service is further configured for:

monitoring a network address on the SAFE server assigned for the agent to check in with the SAFE server.

20. The computer program product of claim 15, wherein the auxiliary service receives the request to run the job on the endpoint from the SAFE server or a client of the SAFE server.

* * * * *